United States Patent [19]

Kamon

[11] Patent Number: 4,875,104
[45] Date of Patent: Oct. 17, 1989

[54] DOCUMENT SHEET POSITION DETECTING DEVICE FOR IMAGE FORMING APPARATUS

[75] Inventor: Kouichi Kamon, Tokyo, Japan
[73] Assignee: Ricoh Company, Ltd., Tokyo, Japan
[21] Appl. No.: 192,522
[22] Filed: May 11, 1988
[30] Foreign Application Priority Data May 13, 1987 [JP] Japan .......................... 62-114465

[51] Int. Cl.⁴ .......................... H04N 1/00; H04N 1/40
[52] U.S. Cl. ...................................... 358/400; 358/474
[58] Field of Search ............... 358/293, 285, 256, 289, 358/290, 292; 250/226; 350/6.5

[56] References Cited

U.S. PATENT DOCUMENTS

| | | | |
|---|---|---|---|
| 4,174,528 | 11/1979 | White | 358/293 |
| 4,338,020 | 7/1982 | Yukawa | 250/561 |
| 4,341,460 | 7/1982 | Kohyama | 355/13 |
| 4,538,185 | 8/1985 | Wiggins | 358/293 |
| 4,554,592 | 11/1985 | Yoshida | 358/293 |
| 4,562,485 | 12/1985 | Maeshima | 358/280 |
| 4,620,234 | 10/1986 | Watambe | 358/293 |
| 4,623,938 | 11/1986 | Asano | 358/285 |
| 4,651,198 | 3/1987 | Knirsch | 358/293 |
| 4,672,461 | 6/1987 | Yoshida | 358/293 |
| 4,675,745 | 6/1987 | Suzuki | 358/285 |
| 4,700,236 | 10/1987 | Abe | 358/293 |
| 4,701,805 | 10/1987 | Maeshima | 358/293 |
| 4,769,718 | 9/1988 | Imamura | 358/293 |

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A document sheet position detecting device adapted to for image forming apparatus, such as digital copiers and facsimile. Apparatus image information on an original document are optically detected using a CCD or other type line sensor and the detected optical signals are converted into electric signals which are fed to a printer or like recording apparatus to reproduce the images. The device detects positional data of the document sheet in a separate operation from the detection of the image read out operation. An optical filter may be inserted during the position detecting operation. The sensor is adjusted for the difference in intensity caused by the filter.

35 Claims, 13 Drawing Sheets

DOCUMENT SHEET POSITION DETECTING DEVICE FOR IMAGE FORMING APPARATUS

BACKGROUND OF THE INVENTION

1. Field of the Invention

The present invention relates generally to an improvement in an image forming apparatus. More particularly, it relates to a document sheet position and/or size detecting device for such an image forming apparatus.

2. Discussion of the Background

A variety of image forming apparatuses, such as digital copiers and facsimile apparatuses, have been developed and applied for practical uses, wherein images on an original document sheet are read by optical means such as line sensors of a CCD system or other types. The optical image information is then converted into electric signals which are fed to a printer or a similar recording apparatus to reproduce the images. In the operation of such an image forming apparatus, the initial step is to place the original document sheet in situ and to detect the position of the document sheet to prepare for initiating the scanning operation. For this purpose, a document sheet position detecting device is necessarily included in the image forming apparatus.

For example, Japanese Laid-Open patent publication (Kokai) No. 56-39555 (Toshiba) discloses a method of detecting the size of a document sheet positioned on an analog copier, wherein the document sheet is covered by a document cover having a spectral reflectance distribution which is different from that of the document sheet. The document sheet and the document cover are exposed to a light and the reflected lights are passed to a photo-coupler which is sensitive to the light reflected by the document sheet and insensitive to the light reflected by the document cover. However, in the system used in this known method, the same photo-coupler is used both for the normal image scanning operation and the operation for detecting the document size. This leads to the disadvantage that a filter must be provided to differentiate the sensitivity in the step of detecting the document size from the sensitivity during the normal image scanning operation. Another proposal has been made and disclosed in Japanese Laid-Open patent publication (Kokai) No. 56-22424 (Konishiroku), wherein a colored document cover is used and the light reflected by the document cover is received by a sensor so that the size of a document sheet is determined. However, this device is low in accuracy, since the white background portion of the document sheet has a wide spectral reflectance distribution and thus only a portion of the light reflected by the document sheet is received by the sensor to lower the accuracy in the document size detection operation. Japanese Laid-Open patent publication (Kokai) No. 59-225669 (Canon) discloses a device wherein the document sheet is covered by a member having a high regular reflectance, and sensor means is provided for receiving light rays which have been irregularly reflected by the document sheet. The area covered by the document sheet is determined by sensing the irregularly reflected light rays. However, this known device has a disadvantage that an undesired blurred fringe is formed around the document area on the reproduced copy when the size of the document sheet is smaller than the sheet on which the reproduced images are recorded or the document sheet is placed in the obliquely dislocated condition.

SUMMARY OF THE INVENTION

A primary object of the present invention is to avoid the aforementioned disadvantages of the prior art and to provide a document sheet position detecting device which is simple in construction and yet has a high accuracy in operation of detecting the size of the document sheet.

A more specific object of the present invention is to provide a generally improved document sheet position detecting device for optically detecting the extension of an image bearing document sheet by a raster scanning operation, comprising:

a document sheet cover for pressing the document sheet onto a contact glass platen, the cover being colored by a certain predetermined color;

illumination means for illuminating the surface of the image bearing document sheet;

an optical system for passing the light rays reflected by the surface of the image bearing document sheet;

a photoelectric converter element for receiving light signals and for converting the light signals into electric signals;

digital converter means for converting the outputs from the photoelectric converter means into digital signals;

an optical filter for shielding light rays reflected by the document cover and for transmitting therethrough light rays reflected by the background of the image bearing document sheet during the document sheet position detecting operation; and data processing means for detecting at least one end of the image bearing document sheet by processing positional data fed from the photoelectric converter means, the positional data indicating the document sheet cover being differentiated from the positional data indicating the background of the image bearing document sheet by the difference in quantity of light rays reflected by the background of the image bearing document sheet and passing through the optical filter to be received by the photoelectric converter means.

Another object of this invention is to provide such a document sheet position and/or size detecting device which is simple in construction and yet utilizable for detecting precisely the position and/or size of the document sheet.

The above and other objects, features and advantages of the present invention will become apparent from the following detailed description taken with accompanying drawings.

DESCRIPTION OF THE PREFERRED EMBODIMENTS

Figure 1:
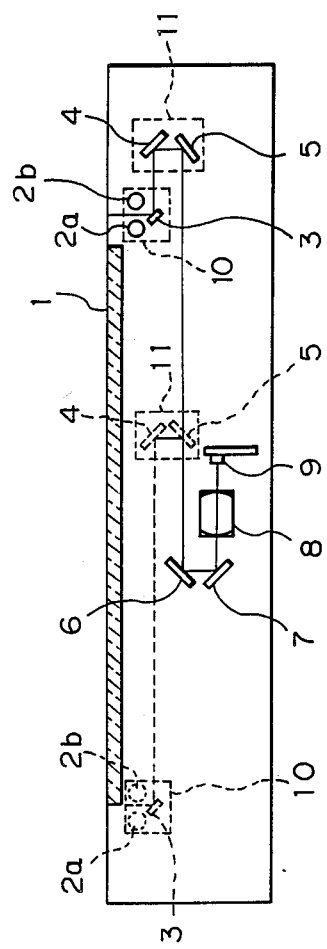
FIG. 1 is a schematic illustration showing the construction of one embodiment of the document sheet position detecting device according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein: FIG. 1 is a schematic illustration showing the construction of an embodiment of the document reading apparatus according to the present invention.

As shown in FIG. 1, a contact glass platen 1 on which an original document sheet (not shown) is placed is illuminated by light sources 2a and 2b, and the reflected light is passed through mirrors 3, 4, 5, 6, 7 and a lens 8 to be focused on the light receiving surface of a CCD image sensor 9. The light sources 2a, 2b and the mirror 3 are carried by a carriage 10 which is disposed beneath the underside of the contact glass platen 1 to move in the direction parallel to the platen along the subsidiary scanning direction (in the right and left direction as viewed in FIG. 1). The mirrors 4 and 5 are carried by a carriage 11 which moves cooperatively with the carriage 10 along the subsidiary scanning direction at a speed of ½ of the moving speed of the carriage 10. The scanning along the main scanning direction is effected by the fixed scanning of the CCD image sensor 9, so that the images on the document sheet are read by the CCD image sensor 9. The entire surface area of the image bearing document sheet is scanned by the combination of the scanning along the main scanning direction and the scanning along the subsidiary scanning direction effected by the movement of the optical system. In the illustrated embodiment, the sampling rate of reading operation along each of the main and subsidiary scanning directions is set to 16 picture elements/mm, and the largest dimensions of the sheet which may be handled by this embodiment is the A-3 size (297 mm×420 mm).

Figure 2:
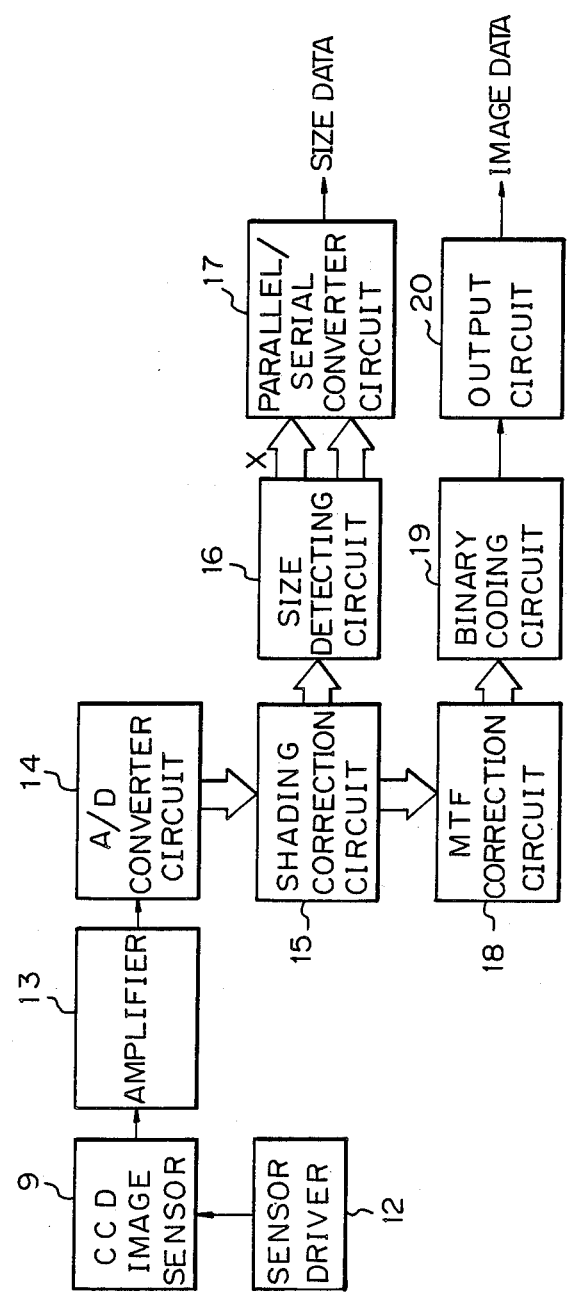
FIG. 2 is a block diagram showing the image data processing sequence.

Referring to FIG. 2 showing the operation sequence for processing the image data, the image data are processed through a system which comprises a sensor driver 12, a CCD image sensor 9, an amplifier 13, an A/D converter circuit 14, a shading correction circuit 15, a size detecting circuit 16, a parallel/serial converter circuit 17, an MFT correction circuit 18, a binary-coding circuit 19, and an output circuit 20. The image signals read out at the sampling rate of 16 picture elements/mm, as described above, are amplified by the amplifier 13 to have a predetermined amplitude, and then converted by the A/D converter circuit 14 into digital data having a predetermined number of tones per picture element (64 tones in this embodiment). After effecting shading correction to correct shading caused by uneven illumination by the light sources 2a, 2b and scattering in sensitivities of CCD image sensor elements, followed by MFT correction of the optical system and pseudo-halftone processing or other various processing required for obtaining final output signals of desired form, the converted signals are fed to a printer. In this embodiment, the signals are binary-coded to be converted into binary signals (black/white picture elements) which are fed to the printer.

Figure 3:
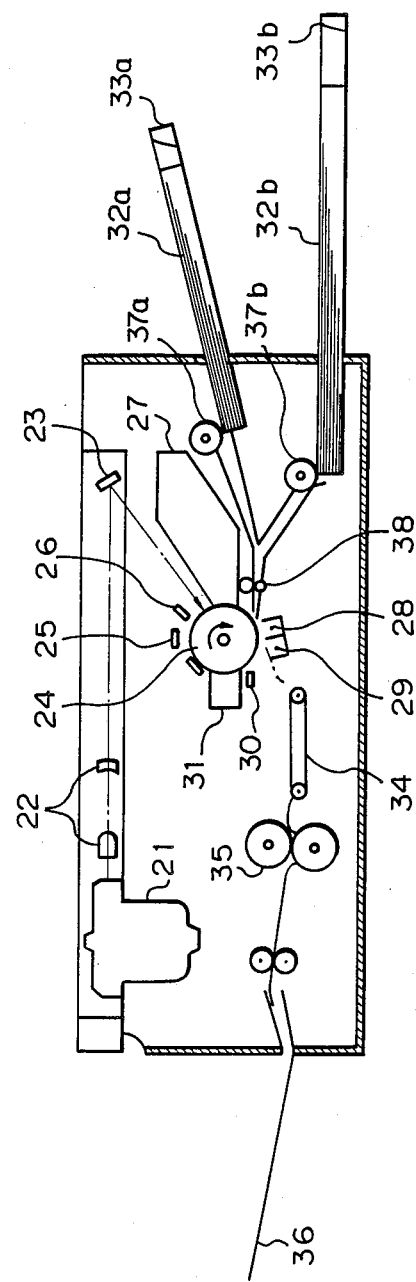
FIG. 3 is a schematic illustration showing the construction of the laser printer used in combination with the device of the present invention.

The construction of the laser printer will now be described by referring to FIG. 3. The document image reading apparatus may be assembled integrally with the laser printer, or may be mechanically separated and electrically connected with each other. The laser printer includes a laser printing system, an image reproducing system and a paper feeder system. The laser printing system includes a laser beam emitting unit 21, an image focusing lens 22 and a mirror 23. Provided in the laser beam emitting unit 21 are a laser diode which serves as a laser beam source, a polygonal mirror which is rotated at a high constant rotational speed, and other necessary components. A laser beam fed from the laser printing system irradiates a photosensitive drum 24 of the image reproducing system. The photosensitive drum 24 is surrounded by an electricity charger 25, an eraser 26, a developer unit 27, a transfer charger 28, a separation charger 29, separator pawls 30, and a cleaning unit 31. A beam sensor (not shown) for generating a main scan synchronizing signal (MSYNC) is disposed at the vicinity of one end of the photosensitive drum 24 to be exposed to the laser beam.

The process for reproducing the image in the laser printer will be described. The peripheral surface of the photosensitive drum 24 is uniformly charged to be at a high electric potential by the electricity charger 25. The electric potential of the peripheral portion irradiated by the laser beam is lowered. As the laser beam is controlled to be in the energized/deenergized state depending on the black/white image to be reproduced, an electric potential distribution corresponding to the images to be reproduced, i.e. latent electrostatic images, are formed on the peripheral surface of the photosensitive drum 24 upon irradiation by the laser beam. As the portion of the photosensitive drum on which latent electrostatic images are formed passes through the developer unit 27, toner particles adhere thereto according to the electric potential distribution so that the latent electrostatic images are visualized by the formation of toner images. A recording sheet 32 is fed from a casette at a predetermined time and the thus formed toner images are covered by the recording sheet. Under the action of the transfer charger 28, the toner images are transferred onto the recording sheet 32, and then the sheet 32 is separated from the photosensitive drum 24 under the actions of the separation charger 29 and the separator pawls 30. The separated recording sheet 32 is conveyed by a conveyer belt 34 and passed through developer rollers 35 where the toner images are heated to be fixed, and then the recording sheet 32 is discharged to a paper discharge tray 36.

The illustrated embodiment has two paper feed systems. In one paper feed system, recording sheets 32a stacked in an upper paper feed casette 33a are fed by a paper feed roller 37a. On the other hand, recording sheets stacked in a lower paper feed casette 33b are fed through a paper feed roller 37b. The recording sheet 32 fed by either one of the paper feed rollers 37a, 37b is first stopped in an abutting condition against a register roller 38, and then fed around the photosensitive drum 24 in synchronism with the progress of the recording process. Although not shown in the Figure, each paper feed system is provided with a recording sheet size sensor for sensing the size of the recording paper sheets contained in each of the casettes 32a, 32b.

Image data read by the digital copier or image reading apparatus having the general construction as described above may be further processed through condensing or other necessary operations and fed through a MODEM into a facsimile apparatus connected to a communication channel.

Prior to the initiation of the image reading operation described above, the position or size of the document sheet placed on the contact glass platen 1 must be detected. The operation of document sheet position and/or size detecting operation will be described below. The standard position for placing the document sheet on the contact glass platen may be varied for the specific type of apparatus used. One of the four corners, such as the right corner at the operator side, may be positioned on the standard setting point. Alternatively, a so-called center standard system may be adopted, in which the center of one side of the document sheet is matched with the central point of right or left side of the contact glass platen. Otherwise, the document sheet is placed at any desired position, and the positions of the corners or sides of the sheet are detected.

Figure 4:
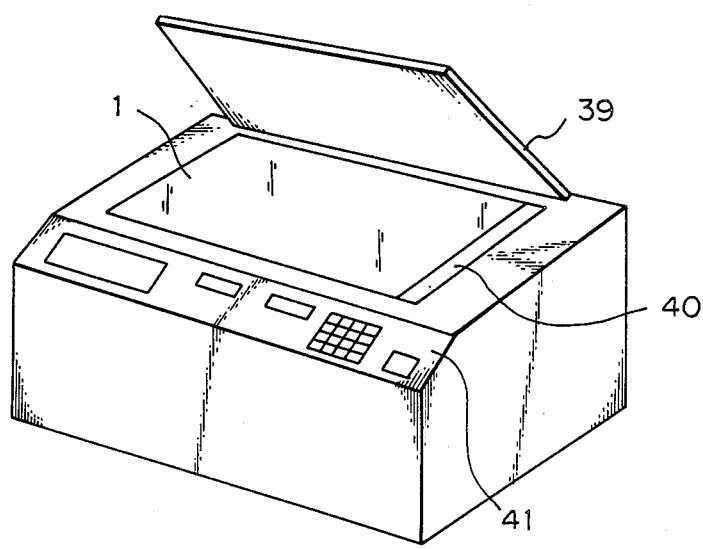
FIG. 4 is a perspective view showing the general contour of the document read-out apparatus.
Figure 5:
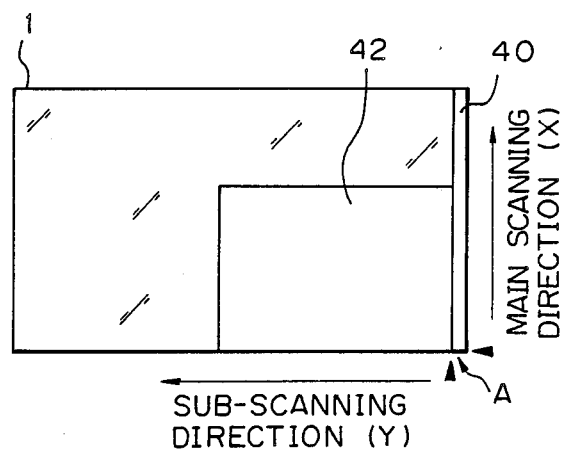
FIG. 5 is a diagrammatical view showing the standard positioning marks for placing the document sheet in situ.

Referring to FIGS. 4 and 5, the following description refers to an exemplified operation in which the right corner of the operator side is marked as a standard point A (see FIG. 5). In FIG. 4, reference numeral 1 designates the contact glass platen, and a document sheet presser is denoted by 39, a scale is denoted by 40, and an operation panel is denoted by 41. In FIG. 5, reference numeral 42 designates the document sheet, the main scanning direction is denoted by the arrow X and the subsidiary scanning direction is denoted by the arrow Y. A document sheet may be set in position by placing it with one corner or side being coincident with the standard point or line, followed by pressing it by the presser 39 or the document sheet is left unpressed by holding the presser 39 in the open position. In an apparatus provided with an automatic document feeder (ADF), a document sheet may be conveyed to the standard position by means of the ADF which may also be used as the presser means for pressing the document sheet onto the contact glass platen 1. In the event when a document sheet is automatically set in the standard position by using an ADF, the size of the document sheet may be detected by the ADF.

The present invention relates to a document sheet position and/or size detecting device adapted to be assembled in an apparatus provided with ADF which is used also as a presser for pressing the document sheet, or the device of the invention may be used in an apparatus having no automatic document feeder. The document sheet position and/or size detecting device, according to this invention, is used to pre-scan the document sheet to detect the position and/or size thereof prior to the normal image reading or copying operation. The CCD image sensor elements used in the normal image reading operation are used as the detector elements. The reflectance of the document presser or document cover plate is set to a high level during the normal copying operation, and a filter impermeable to the light reflected by the cover plate and permeable to the light reflected by the background of the document sheet is used during the position and/or size detecting operation, and the output from the CCD sensor for the document cover area is differentiated from that for the background of the document sheet.

The operation of the embodiment of the present invention will be described hereinbelow.

Figure 6:
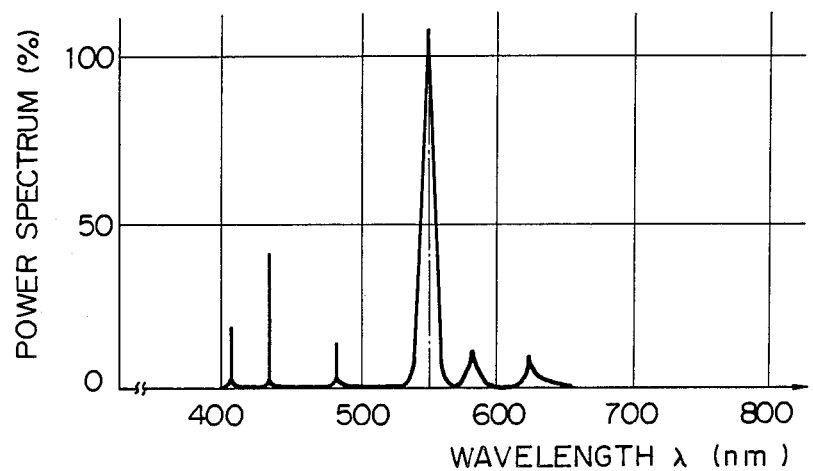
FIG. 6 is a graphic representation showing the power spectral distribution characteristics.
Figure 7:
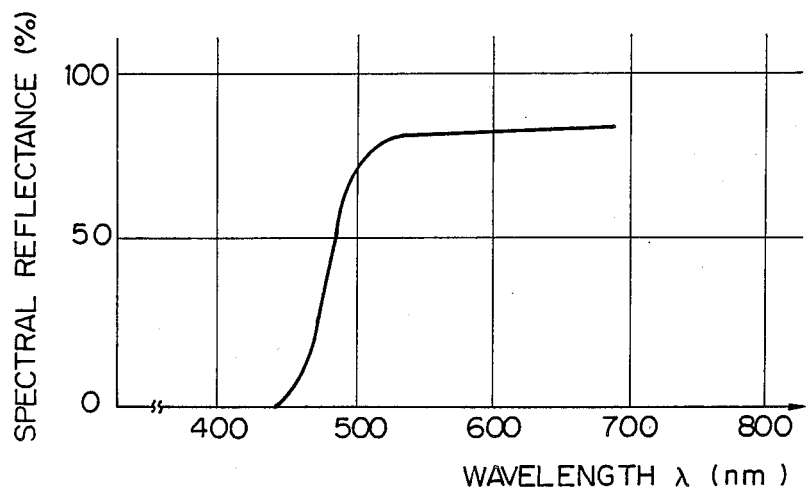
FIG. 7 is graphic representation showing the spectral reflectance characteristics of the platen on which the document sheet is placed.
Figure 8:
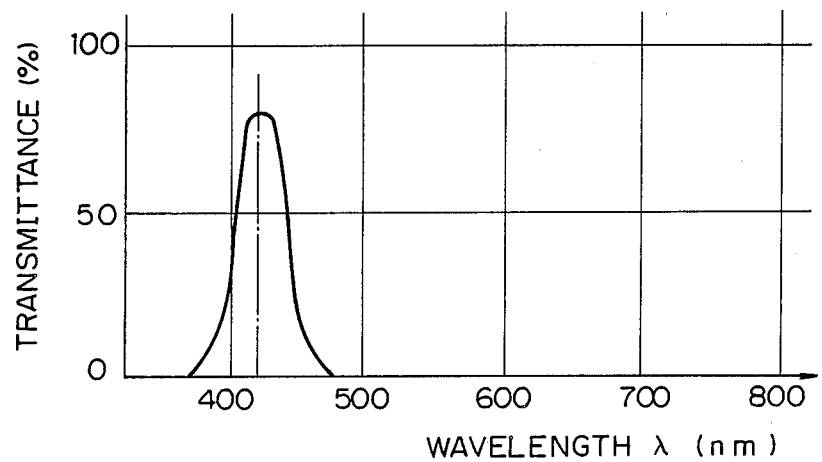
FIG. 8 is a graphic representation of the spectral transmission characteristics of the optical filter.

FIG. 6 shows the spectral distribution characteristics of the light rays emitted from the fluorescent lamp used in the following embodiment. As seen from FIG. 6, the center wavelength of the spectral distribution of the light emitted from the lamp is 550 nm, and relatively intense peaks are found at 410 nm, 440 nm, 480 nm, 580 nm and 620 nm. A document cover plate or a belt of the ADF acting as the presser for the document sheet is colored yellow to have the spectral reflectance distribution as shown in FIG. 7. As shown, the document cover plate or presser belt used in the present invention has a high spectral reflectance in the range of higher than 500 nm. By the use of the combination of the aforementioned fluorescent lamp and the yellow colored document sheet cover (or belt of the ADF), the light reflected by the cover during the normal image reading operation is in the white light level. Accordingly, there is no fear that the background of the document sheet or the portion of the recording sheet uncovered by the document sheet is blackened. The aforementioned fluorescent lamp and the document cover (or the belt of the ADF) are used, and an optical filter having a spectral transmission characteristic as shown in FIG. 8 (having a peak at 420 nm) is interposed through the optical path of the reflected light during the document sheet position and/or size detecting operation, whereby the light rays reflected by the document sheet cover (or the belt of ADF) is shielded and the white light (within the wavelength range of from 400 nm to 480 nm) reflected by the background of the document sheet is sensed by the CCD image sensors to differentiate the intensity of the light reflected by the background of the document sheet from that of the light reflected by the document sheet cover.

Figure 9:
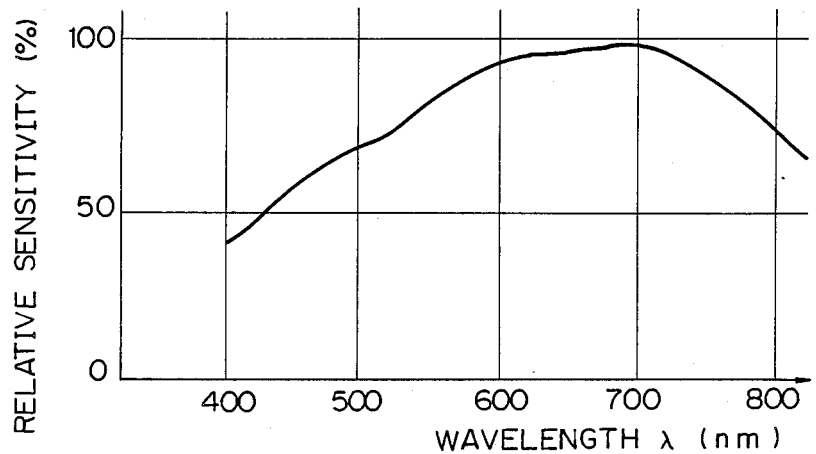
FIG. 9 is a graphic representation of the spectral sensitivity characteristics of the CCD image sensor.

FIG. 9 shows the spectral sensitivity characteristics of the used CCD image sensor. As seen from the graph, the CCD image sensor used in this embodiment is sensitive to the light rays having the wavelengths ranging from 400 nm to 480 nm. However, by the interposition of the optical filter, the light quantity incident to the image sensor is decreased. In order to compensate for the decrease in quantity of light so that the document sheet position and/or size detecting operation is stabilized, some of the operation conditions in the document sheet position and/or size detecting operation are changed from those in the normal image reading operation. A first measure to compensate for the decrease in quantity of light is to increase the quantity of light emitted from the fluorescent lamp. However, since the quantity of light received by the CCD image sensor is decreased to about 1/20 by the combined use of the aforementioned fluorescent lamp and the optical filter, the decrease in quantity of light cannot be fully compensated by simply increasing the quantity of light emitted from the lamp. A second measure for compensation is to prolong the time for charge accumulation in the CCD image sensor. As there is no restriction in practice of the second measure, it is possible to compensate for the decrease in quantity of light in the order of about 1/20 by adopting the second measure. It is thus recommended to adopt the second measure which may be combined with the first measure of increasing the quantity of light emitted from the fluorescent lamp.

In the illustrated embodiment, the quantity of light emitted from the fluorescent lamp is not changed, and the time for charge accumulation is prolonged as long as 16 times to compensate the decrease in quantity of light received by the image sensor. However, during the normal image reading operation, particularly when the device is connected to a laser printer to be used as a digital copier, the time for charge accumulation cannot be changed since the horizontal synchronizing signal (HSYNC) of the read-out raster scanning is synchronized with the main scanning synchronizing signal (MSYNC) fed from the beam sensor of the laser printer so that the time for charge accumulation for the CCD image sensor is in synchronism with the HSYNC. In contrast thereto, since the print-out operation is not carried out during the document sheet position and/or size detecting operation, HSYNC may be disconnected from MSYNC and a desired HSYNC may be programmed in the image read-out device. The transmission rate from the CCD image sensor is varied in accordance with the variation in HSYNC.

This may be done by using different video clocks (VCK) which are the basic clock signals for the circuit for processing the image signals. By adopting such measures, the same circuit is used for actuation of the CCD image sensors both for detecting the document position and/or size and for detecting the image data even if the timing in the normal image reading operation is different from that in the document sheet position and/or size detecting operation. Since the printing operation is not carried out during the document sheet position and/or size detecting operation, the signal (FGATE) indicating emission of image signals shall not be fed from the image reading device to an external equipment, such as a printer. However, there is no risk of erroneous operation by the provision of a system controller which controls precisely the normal image reading operation and the document sheet position and/or size detecting operation.

As the time for charge accumulation in the CCD image sensor is increased as long as 16 times, the sampling pitch along the subsidiary scanning direction is increased to 16 times since the time for charge accumulation is in proportion to the moving speed of the optical system. Although the sampling pitch may be maintained at the initial level of 16 dots/mm by prolonging the time for charge accumulation as long as 16 times and by lowering the moving speed of the optical system to 1/16, it is unnecessary to keep the resolving power and the accuracy during the document sheet position and/or size detecting operation so high. Conversely, it is desirous to decrease the time necessary for the preparatory operation prior to the normal image reading operation. It suffices that the accuracy in paper size detecting operation is on the order of 1 mm, and even on the order of 2 to 3 mm for the inspection of formal size sheets. In consideration of the foregoing, the moving speed of the optical system during the sheet size detecting operation is set to two times as high as that during the normal image reading operation, in this embodiment, so that the sampling pitch is set to 2 mm along the subsidiary scanning direction and the sampling pitch along the main scanning direction is kept at 16 dots/mm.

In the image reading device used in this embodiment, the output from the CCD image sensor is amplified to have a programed amplitude. The gain of the amplifier is determined for each raster scanning, based on the variation in quantity of light emitted from the fluorescent lamp due to a temperature change or deterioration with the lapse of time. A standard white plate is mounted intermediately from the home position of the carriage 10 (see FIG. 1) to the position for initiating detection of the document sheet, and the gain of the amplifier is set so that the output from the CCD image sensor for the light reflected by the standard white plate is amplified to the predetermined potential level. After the determination of the gain, the output from each image sensing element (digital datum after A/D conversion) for the standard white plate is stored in the memory to be used in the later operation of effecting the shading correction to correct the uneven illumination along the main scanning direction by the fluorescent lamp and to correct scattering of sensitivities of respective CCD image sensor elements. During the image reading operation, the shading correction is effected by comparing the output data from respective CCD image sensor elements with the stored data for respective elements at the time of sensing the standard white plate.

In the illustrated embodiment, the gain is set by referring to 2 lines (2 raster scanning lines) along the main scanning direction, and the shading data are stored in the memory by referring to about 32 lines (32 raster scanning lines) and the maximum (whitest) datum is stored. The gain is set and the shading data are stored also during the document sheet position and/or size detecting operation. However, in the document position and/or size detecting operation, since the sampling pitch along the subsidiary scanning direction is enlarged to 2 mm as described above, the standard white plate must have the width of 68 mm when the raster scanning runs are repeated for 2 times for setting the gain and additionally for 32 times for storing the shading data. In such a case, the distance from the home position of the carriage 10 to the position for initiating the image reading operation must be 68 mm or more. In the normal image reading operation, the width required for setting the gain and storing the shading data is about 2 to 5 mm. However, in the document position and/or size detecting operation, the width of 2 to 5 mm corresponds only to 1 to 2 raster scanning runs. At least 2 raster scanning runs are necessary for setting the gain and at least 2 raster scanning runs are necessary for storing the shading data, and thus the minimum width of the standard white plate is 8 mm. The width of the standard white plate or the number of the raster scanning runs in the document size detecting operation should be differentiated from that in the normal image reading operation.

Figure 10:
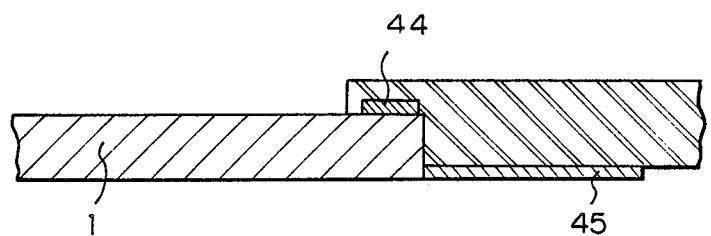
FIG. 10 is an enlarged section showing exemplary standard white plates mounted in position.

FIG. 10 is an enlarged section showing one example of the arrangement of the standard white plates. Referring to FIG. 10, a first standard white plate 44 is mounted on the upper surface to extend along one side end of the contact glass platen 1, and a second standard white plate 45 having a width larger than that of the first standard white plate 44 is disposed adjacent to the one side edge of the platen 1. The first standard white plate 44 is used in the normal image reading operation, and the second standard white plate 45 (or both of the first and second standard white plates 44 and 45) is used in the document sheet position and/or size detecting operation.

The operation sequence of the normal image reading operation is different from that of the document sheet position and/or size detecting operation. In a digital copier cooperating with a laser printer, when it is desired to initiate the image reading operation, the print start button is pushed to start the feeding of a recording sheet which is stopped by the register roller in the stand-by condition. The fluorescent lamp of the reading device is then energized and the carriage is begun to move. After moving the carriage 10 by a certain distance for stabilizing the moving speed thereof and after some time lag for stabilizing the quantity of light emitted from the fluorescent lamp, the standard white plate is sensed and then the images on the document sheet are read as the image bearing area is scanned, the binary-coded image data (binary signals indicating white or black picture elements) being fed to the printer section. As described hereinbefore, the printing system of the laser printer is started so that latent images are formed by exposure to the laser beam and the formed latent images are developed. As the toner images are formed on the surface of the photosensitive drum, the recording sheet is fed through the register roller while registering the recording sheet in situ, followed by transferring, separation and fixing, to complete the copying operation.

In the document sheet position and/or size detecting operation, the reading system may be actuated independently, since the laser printer is not operated during this operation. In addition, the width of the standard white plate detected during this operation is larger than that in the normal image reading operation, and thus the operation sequence is somewhat modified. The fluorescent lamp is initially energized upon pushing the button. However, since the moving speed of the carriage 10 is higher than that in the normal image reading operation and the time for initiating detection of the standard white plate is earlier than that in the normal image reading operation, the time lag from the energization of the fluorescent lamp to the time for starting the movement of the carriage 10 must be prolonged so that the carriage 10 begins to move after the quantity of light emitted from the lamp has been sufficiently stabilized. The entire surface area of the contact glass platen is scanned for detecting all document sheets placed on the contact glass platen.

Figure 11:
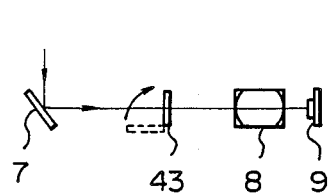
FIGS. 11 and 12 are diagrammatical illustrations showing the optical filters interposed through the optical path of the reflected light.
Figure 12:
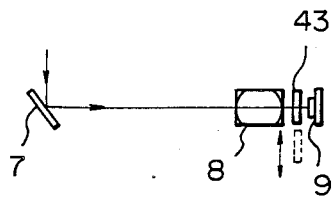

The optical filter will now be described in detail with reference to FIGS. 11 and 12.

The optical filter may be disposed at any location along the optical path of the reflected light. In the embodiment shown in FIG. 11, a small optical filter 43 is disposed between the mirror 7 and the lens 8. The optical filter 43 is swingably mounted to a raised position (shown by the solid line in FIG. 11) at which it is interposed through the optical path and to a lying position (shown by the broken line in FIG. 11) at which it is held out of the optical path. Another example for incorporating the optical filter 43 is shown in FIG. 12, wherein the optical filter 43 is disposed between the lens 8 and the CCD image sensor 9. The optical filter 43 is movable along the vertical direction to an upper position at which it is interposed through the optical path and to a lower position at which it is retracted from the optical path. With the constructions as shown in FIGS. 11 and 12, it is possible to use a small filter to avoid adverse flare or other influences. The optical filter 43 is retracted from the optical path during the image reading operation, and interposed through the optical path only during the document sheet position and/or size detection operation. The optical filter 43 is interposed at a time from the time of energization of the fluorescent lamp to the time of moving the carriage. The optical filter may be interposed through the optical path before the push-on of the start button or at a time from the completion of detection of the standard white plate to the time at which the carriage 10 reaches the end of the image bearing area. In the case where the optical filter 43 is interposed after the completion of detecting the standard white plate, the time for charge accumulation in the CCD image sensor is kept at the same level as of the normal image reading operation until the filter is interposed in situ, and the time for charge accumulation in the CCD image sensor is set to a level 16 times as high as that of the ordinary level after the filter has been interposed through the optical path.

In operation of the document sheet position and/or size detecting device, the conditions or parameters therefor are set as aforementioned. The reading device is operated under the aforementioned conditions to generate the information relating to the document sheet size in the following manner.

The practical image data are utilized for the detection of the document sheet size. Thus, the sensor driver 12, the amplifier 13, the A/D converter circuit 14 and the shading correction circuit 15 included in the system shown in FIG. 2 and used for the normal image reading operation may be utilized for the document size detecting operation. The image data which has been already subjected to shading correction are divided into the data indicating the document sheet cover area and the data indicating the image bearing document sheet area by one of the following two processings. The first processing includes binary-coding of the data by a certain threshold so that the data indicating the density level or tone of the document sheet cover is discriminated from the data indicating the density level or tone of the background of the document sheet. The second processing includes monitoring of the difference between the density level of one picture element and the densities of the picture elements positioned in the neighborhood of said one picture element to find out the end of the document sheet.

The former-mentioned processing, i.e. discrimination by binary-coding, is simple and can be practised by the use of a simple circuit. However, when the original document is a second order original document or written or printed on a sheet of tracing paper to have a relatively high transparency, or when the spectral reflectance distribution of the document sheet cover resembles that of the document sheet cover, the density level of the former is approximate to that of the latter to make it difficult to select a proper threshold due to uneven illumination or due to scattering in sensitivity of the used CCD image sensor. In such a case, the accuracy and reliability in discrimination is lowered to pose a problem. The latter mentioned processing has an advantage that the document sheet size can be detected, irrespective of the material and condition of the document sheet, by sensing the difference in densities of individual picture elements. Even if the density level of the document sheet cover and that of the document sheet are scattered, the border between the cover and the document sheet can be detected by adopting the latter mentioned processing. Although the latter mentioned processing is adopted in the following example, the former mentioned processing may be adopted within the scope of the present invention.

Figure 13:
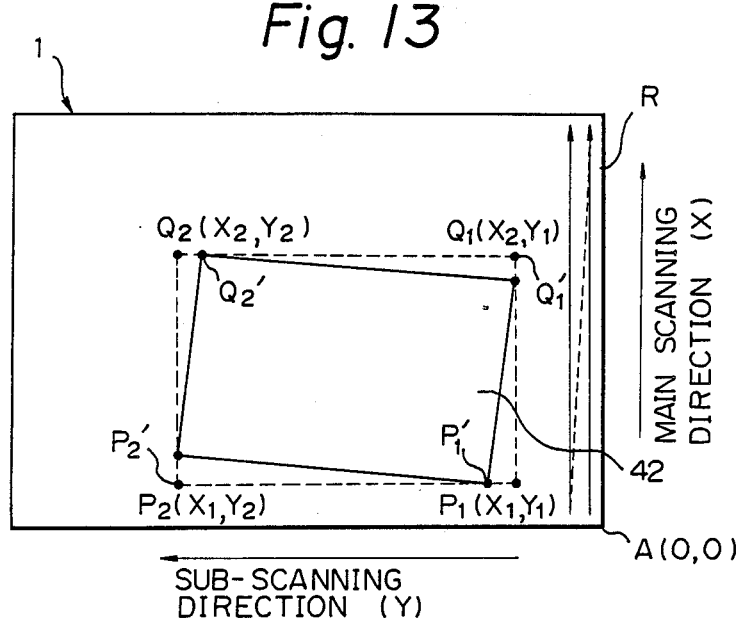
FIG. 13 is a diagrammatical illustration showing the document sheet position (or size) detecting operation.
Figure 14:
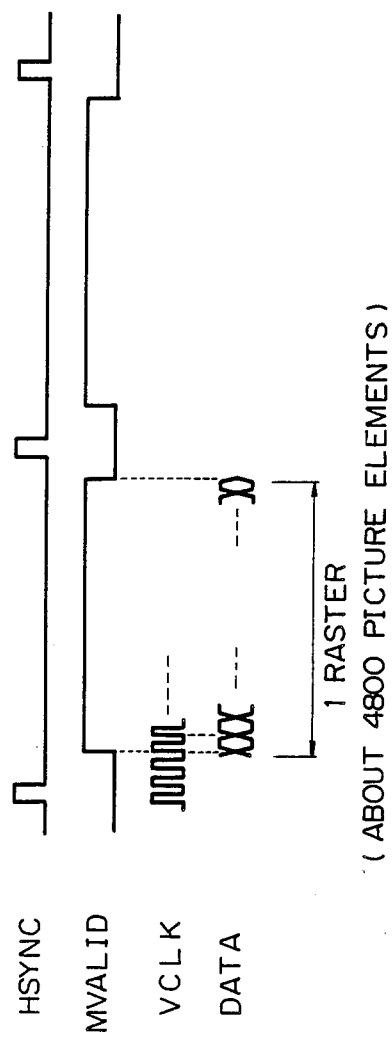
FIG. 14 is a timing chart showing the operation timing during the document sheet position detecting operation.

The raster scanning lines R in the practice of this example is shown in FIG. 13 wherein the main scanning direction is denoted by X and the subsidiary scanning direction is denoted by Y. The standard point for placing the document sheet is denoted by A which is the origin (0, 0) of the coordinate axes X and Y, and the document sheet is shown by the solid line in FIG. 13. The document sheet area is recognized as the area surrounded by the four corners or points $P_1$, $P_2$, $Q_1$ and $Q_2$. Supposing now that the document sheet 42 has a quadrilateral shape and the standard positioning point is A, it suffices to detect only the point $Q_2$ ($X_2$, $Y_2$). However, no significant difficulty is encountered in detection of the other three points. It is also possible to detect the four corner points $P_1'$, $P_2'$, $Q_1'$ and $Q_2'$ of the obliquely positioned document sheet 42. In the following description, an exemplary operation of detecting the points $P_1$, $P_2$, $Q_1$ and $Q_2$, namely the values $X_1$, $X_2$, $Y_1$ and Y, will be described. Since the image data are obtained by a raster scanning operation, input data are unidirectional data along the X axis (along the main scanning direction). FIG. 14 is a timing chart showing HSYNC, MVALid, VCLK and the image data. As seen from FIG. 14, one raster run is read per one cycle of HSYNC, and a MVALiD signal showing the area of the contact glass platen or the effective image range is generated so that the image data fed within the effective image range are used. In this example, data of about 4800 picture elements are supplied per one raster run in synchronism with VCLK. The input signals are 6-bit signals showing 67 tone levels/picture element so that the whitest level is 0 (zero) and the blackest level is 63.

The typical method for detecting ends of a sheet by sensing the neighboring picture elements is the method for sensing the adjacent picture elements by the use of a Laplacian filter. However, the border between the background of the document sheet and the document sheet cover is to be detected in this example by, the density level of the cover being substantially even and the density level of the background of the document sheet in the vicinity of the border being substantially even. In view of the foregoing, in this example, the density level of a certain picture element is compared with that of another picture element separated by some picture elements from the former, and when the data indicate substantially equivalent difference in density level for successive comparison operations, such a data pair is held as a candidate data pair indicating the border between the background of the document sheet and the document sheet cover. More specifically, in this example, the density levels of individual picture elements are compared with those of the picture elements separated by three picture elements, and when the differences in density level of the three data pairs take the values larger than a predetermined value, the location is recognized as the candidate for indicating the border.

Figure 15:
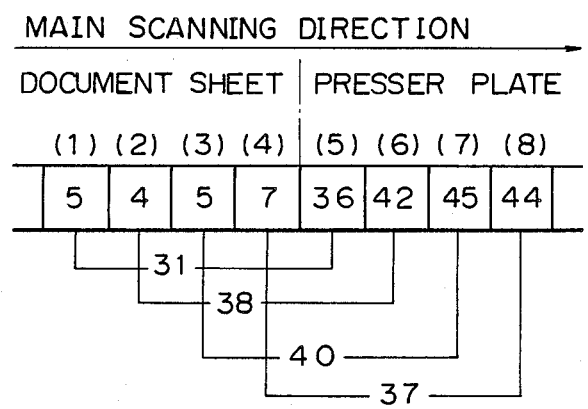
FIG. 15 is an illustration showing the operation of discriminating the ends of the document sheet.

More in detail, FIG. 15 shows an example of the recognition of the border between the background of the document sheet and the document sheet cover. In this example, it will be supposed that the density of the picture element (1) is 5, that the density of the picture element (2) is 4, that the density of the picture element (3) is 5 that the density of the picture element (4) is 7, that the density of the picture element (5) is 36, that the density of the picture element (6) is 42, that the density of the picture element (7) is 45, and that the density of the picture element (8) is 44. Since the density of a certain picture element is compared with that of another picture element which is separated by three picture elements, the results of comparison are that the density of the picture element (1) is different from that of the picture element (5) by 31, that the density of the picture element (2) is different from that of the picture element (6) by 38, that the density of the picture element (3) is different from that of the picture element (7) by 40, and that the density of picture element (4) is different from that of the picture element (8) by 37. It is programed that a location is extracted to be a candidate for indicating the border when the results of three successive comparison operations show the difference in density of larger than 5. Thus, the boundary between the picture element (4) and the picture element (5) is a candidate for the border between the document sheet and the document sheet cover.

Referring back to FIG. 13, the first end detected by each raster scanning is a candidate for the value $X_1$, and the last end detected by each raster scanning is a candidate for the value $X_2$. The candidate for the value $X_1$ in the next raster scanning is compared with the candidate for the value $X_1$ in the preceding raster scanning, and the candidate for the value $X_2$ in the next raster scanning is compared with the candidate for the value $X_2$ in the preceding raster scanning. The smaller candidate is stored as the candidate for the value $X_1$, and the larger candidate is stored as the candidate for the value $X_2$. The raster scanning and comparison operations are repeated so that the smallest candidate is left for the value $X_1$ and the largest candidate is left for the value $X_2$ until the last subsidiary scanning operation is completed. The document sheet area along the X axis extends from $X_1$ to $X_2$. In this manner, the values $X_1$ and $X_2$ can be determined, irrespective of the change in density on the document sheet 42. By keeping the candidate values $Y_1$ paired with the smallest candidate $X_1$ and also keeping the candidate value $Y_2$ paired with the largest candidate $X_2$, the locations of the points $P_1'$ and $P_2'$ along the coordinate axes X and Y in FIG. 13 are detected.

$Y_1$ and $Y_2$ paired with the candidates $X_1$ and $X_2$ indicating the ends of the document sheet are used directly as the detected signals. All of the locations along the Y axis paired with the candidate data along the X axis found in every raster scanning operations are deemed as those included in the document sheet area. Although a similar processing may be taken also along the Y axis, the circuit used for processing the data along the Y axis is somehow complicated since a line delaying operations are needed in addition to the need of memory means. To avoid the use of a complicated circuit, the document sheet area is detected unidimensionally only along the X axis in this example. As the carriage 10 is moved along the Y direction or axis, the Y address of the first raster including one or more candidate data indicating an end of the document sheet is stored. This Y address is stored as $Y_1$. As the carriage 10 moves further, a raster including no candidate datum appears. The Y address of this raster is stored. There is a case where a raster including data indicating one or more candidates indicating an end of the sheet appears again, for example due to the presence of a black zone extending along the marginal portion of the document or due to shading caused by the bundling portion of a book. In such a case, it is necessary to re-store the Y address of the raster scanning run from which the candidate datum indicating the end of the sheet disappears. Anyway, the $Y_2$ is the Y address of the first raster scanning run which has no candidate datum indicating the end of the sheet disappears. The location of the point $Q_2'$ can be denoted by combining the $Y_1$ with $X_2$, and the location of the point $P_2'$ can be denoted by combining $Y_2$ with $X_1$.

Figure 16:
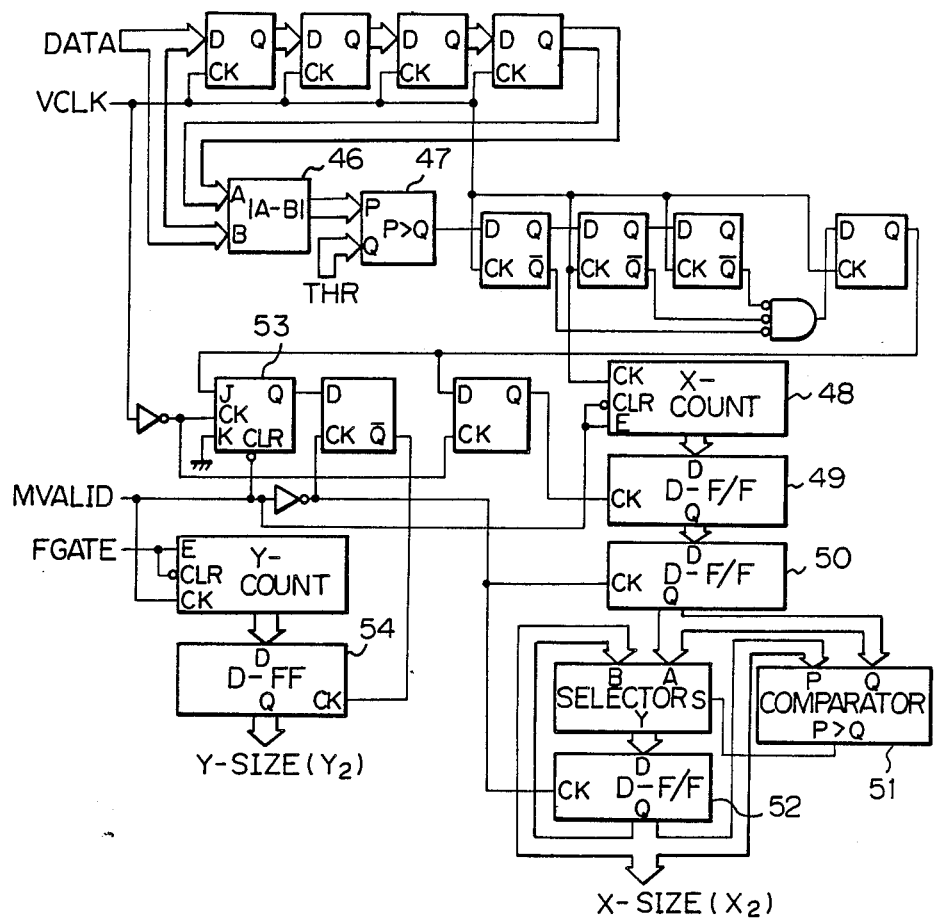
FIG. 16 is a block diagram showing the operation of detecting the size of the document sheet along the X and Y directions.

An embodiment of the circuit which may be used during the detecting operation is shown in FIG. 16. The circuit shown in FIG. 16 may be used for determining $X_2$ and $Y_2$ in the manner described above. A 6-bit image signal (DATA) fed in synchronism with the VCLK and a signal obtained by delaying the signal DATA by a delay time of four cycles of the VCLK, i.e. by a delay time corresponding to four picture elements, are supplied to a difference detecting circuit 46 where the absolute value of the difference between these signals is detected. The output from the difference detecting circuit 46 is passed to a comparator circuit 47 where the absolute value of the difference is compared with a certain threshold THR (in the example shown in FIG. 15, the threshold is set to 5). When the result of comparison reveals that the difference is larger than the threshold, a signal "H" is generated from the comparator circuit 47. When the signals "H" are generated successively for three times, a final output signal "H" is emitted as a candidate signal indicating an end of the document sheet.

In order to detect the size along the X axis, an address counter (X-count) 48 is provided, which counts up in synchronism with the VCLK from 0 (zero) as long as the MVALiD is held at "H". The output from the address counter 48 is fed to a first D-F/F circuit 49. The first D-F/F circuit 49 passes the count number stored in the X-count 48 to a second D-F/F circuit 50 when the candidate signal is changed form "L" to "H" within the time duration when the MVALiD is held at "H". At every time when the end candidate signal is changed from "L" to "H" within the time duration when the MVALiD is held at "H", the data are updated. However, at the time of detection of $X_1$, the data should not be updated. The output from the second D-F/F circuit 50 is the X-address of the final end candidate in each raster at the time of termination of the time duration at which MVALiD is held at "H". The output from the second D-F/F circuit is fed to a comparator 51 where it is compared with the address held by the preceding raster, and the larger address is selected and fed to a last D-F/F circuit 52. Thus, the largest address is held by the last D-F/F circuit 52. The value finally held by the last D-F/F circuit is $X_2$ (X size). $X_1$ may be determined by keeping the smaller value in every comparing operation.

In order to detect the size along the Y axis, a J-KF/F circuit 53 is provided, the J-KF/F circuit being cleared (Q="L") at every time when the MVALiD takes "L". The J-KF/F circuit is set (Q="H") at every time when at least one candidate signal is included during the time duration of MVALiD="H". The output (Q) from the J-KF/F circuit 53 is fed to a D-F/F circuit 54 at the time of termination of MVALiD="H". The Y address is counted by a Y-count which counts up from 0 (Zero) in synchronism with the MVALiD during the time duration when the FGATE signal showing the effective image period along the subsidiary scanning direction takes "H". The thus counted Y-adress is fed to the D-F/F circuit 54 when the output Q from the D-F/F circuit 54 is changed from "L" to "H" to show that shifting from a raster including a candidate signal to a raster including no candidate signal takes place. If shifting from the condition of Q="L" to the condition of Q="H" takes place for plural times, the Y address is updated to obtain the value indicating the point $Y_2$ (Y-size). If the Y-address is stored at the time when the first shifting from the condition of Q="L" to the condition of Q="H" takes place and the thus stored value is not updated, the Y-address of the point $Y_1$ is obtained.

Although picture elements are compared with the picture elements separated by three picture elements to calculate the differences in the illustrated embodiment, individual picture elements may be compared with the picture elements separated by less than two or more than four picture elements. However, in the illustrated embodiment, the CCD image sensor is driven so that the even picture elements are processed by an analog processing system (throughout the operation sequence from the operation of sensing by the CCD image sensor to the A/D converting operation), and a separate analog processing system is provided for processing the odd picture elements. In view of the above, it has been programed to compare odd picture elements with different odd picture elements and even picture elements are compared with different even picture elements in order to eliminate errors which might be involved in comparison operation.

As has been described hereinbefore, in accordance with the principle of the present invention, a circuit for processing binary signals obtained by binary-coding the density level of the background of the document sheet from the density level of the document sheet cover by setting a certain threshold, rather than using the circuit for processing the signals generated by the detection of the ends of the sheet.

The ends of the document sheet may also be detected while using a two-dimensional filter rather than using a unidimensional optical filter to detect the unidimensional difference as carried out in the illustrated embodiment, with the components other than the filter being the same as those used in the illustrated embodiment.

In the illustrated embodiment, the size along the Y axis or direction is detected by 2 mm unit, and the size along the X axis or direction is detected by the unit of a single picture element at the finest and the unit for detection along the X axis may be set to any multiple of picture element by changing the manner for processing the output from the counter. In general, it is considered that the required precision along the X direction is equivalent to that along the Y direction. Accordingly, in the illustrated embodiment, bits of the low orders fed from the X-count are cut away so that the size along the X axis is detected by 2 mm units.

The detected X-size and Y-size may be supplied to actuate a system for the automatic selection of the size of a recording sheet incorporated in a digital copier, a system for the automatic selection of magnification incorporated in a facsimile apparatus or a system for the correction of dislocation of the original document. For such a purpose, the detected size data should be supplied to a system controller which controls such a function.

In the illustrated embodiment, the x-size and the y-size are converted into serial data by parallel/serial conversion, and the thus converted data are read-out one by one upon receipt of read-out pulses from the CPU. The bit numbers (total of the bit numbers of X-size and Y-size) and the order of transmission of the data should be pre-set. In the illustrated embodiment, the transmission order is $Y_{MSB}$, -----, $Y_{LSB}$, $X_{MSB}$, -----, $X_{LSB}$, and the bit number along the X axis is eight and the bit number along the Y axis is also eight so that the total bit number is sixteen.

Otherwise, the data relating to the X-size and Y-size may be transmitted in parallel with each other either through separate lines or through a common bus, or the size of the document sheet is discriminated to be one of the standard sizes including A4, B4 and other sizes, and the data relating to the size is converted into a single coded datum which is fed as an output signal. However, the process of converting the data to serial signals can be applied for practical uses in combination with a simplest system.

In order to preclude the erroneous operation caused by a stain or dust adhering to the document sheet cover or presser plate during the document sheet position detecting operation which is effected by monitoring the difference between the density of a certain picture element from that of a picture element positioned nearly to the said picture element, it may be programed so that a picture element having a density higher than a predetermined level is not deemed as that indicating an end of the sheet irrespective of the detected difference.

In response to the data indicating the position or size of a document sheet, the timing for emitting image forming signals for printing or for communication through facsimile may be adjusted. For example, in the illustrated embodiment, the image forming signals are fed to an external equipment, such as a printer or a facsimile controlling device, so that the image forming signals are fed simultaneously with feeding of the image validification signal along the main scanning direction and the image validification signal along the subsidiary scanning direction and these signals are received by the printer or the facsimile controlling device. Dislocation of the document sheet may be compensated by effecting reproduction through the laser printing or by effecting transmission while correcting the positional signals by $X_1$ and $Y_1$ shown in FIG. 13. Alternatively, dislocation of the document sheet may be compensated by delaying generation of image validification signals (MVALiD) by lags corresponding to $X_1$ and $Y_1$ detected by the document sheet position and/or size detecting operation.

The points $P_1'$, $P_2'$, $Q_1'$ and $Q_2'$ shown in FIG. 13 are detected, and the oblique dislocation of the document sheet 42 may be compensated by using a proper memory device. In detail, after the image signals have been stored in a memory device, the addresses for access to the memory to read out the stored data are modified by the addition of the datum relating to the slanting angle of the line extending from the point $P_1'$ to the point $Q_1'$. It suffices to modify every image data by a constant address modifying pattern which may be calculated by a CPU or an equivalent unit after the document sheet position has been detected, and the address modifying pattern is supplied to the address circuit to realize the desired modification.

In the illustrated embodiment, as shown in FIG. 4, a quadrilateral document sheet is placed on the contact glass platen with one corner of the sheet placed on the standard positioning point marked on the platen, and the position of the corner diagonal to said one corner is detected to determine the size of the document sheet.

The size of the document sheet may be determined by the methods other than the aforementioned process. A first alternative method involves detection of at least three corners, and the size of the document sheet is calculated from the positional data relating to the three corners. A second alternative method comprises the step of setting a standard positioning line which is marked on the contact glass platen, and the document sheet is placed on the contact glass platen with one of its sides extending along the standard line, followed by detection of the positions of two corners of the side opposed and parallel to the side extending along the standard positioning line, so that the size of the document sheet is calculated from the positional data relating to the latter-mentioned two corners. A third alternative method involves provision of one standard positioning line having the center thereof marked on the contact glass platen, and the document sheet is placed so that its one side extends along the standard positioning line and the center of the side is coincident with the center mark of the standard positioning line, followed by detection of one of the corners of the side opposed and parallel to the side extending along the standard positioning line, so that the size of the document sheet is calculated from the positional data relating to the detected corner.

Figure 17A:
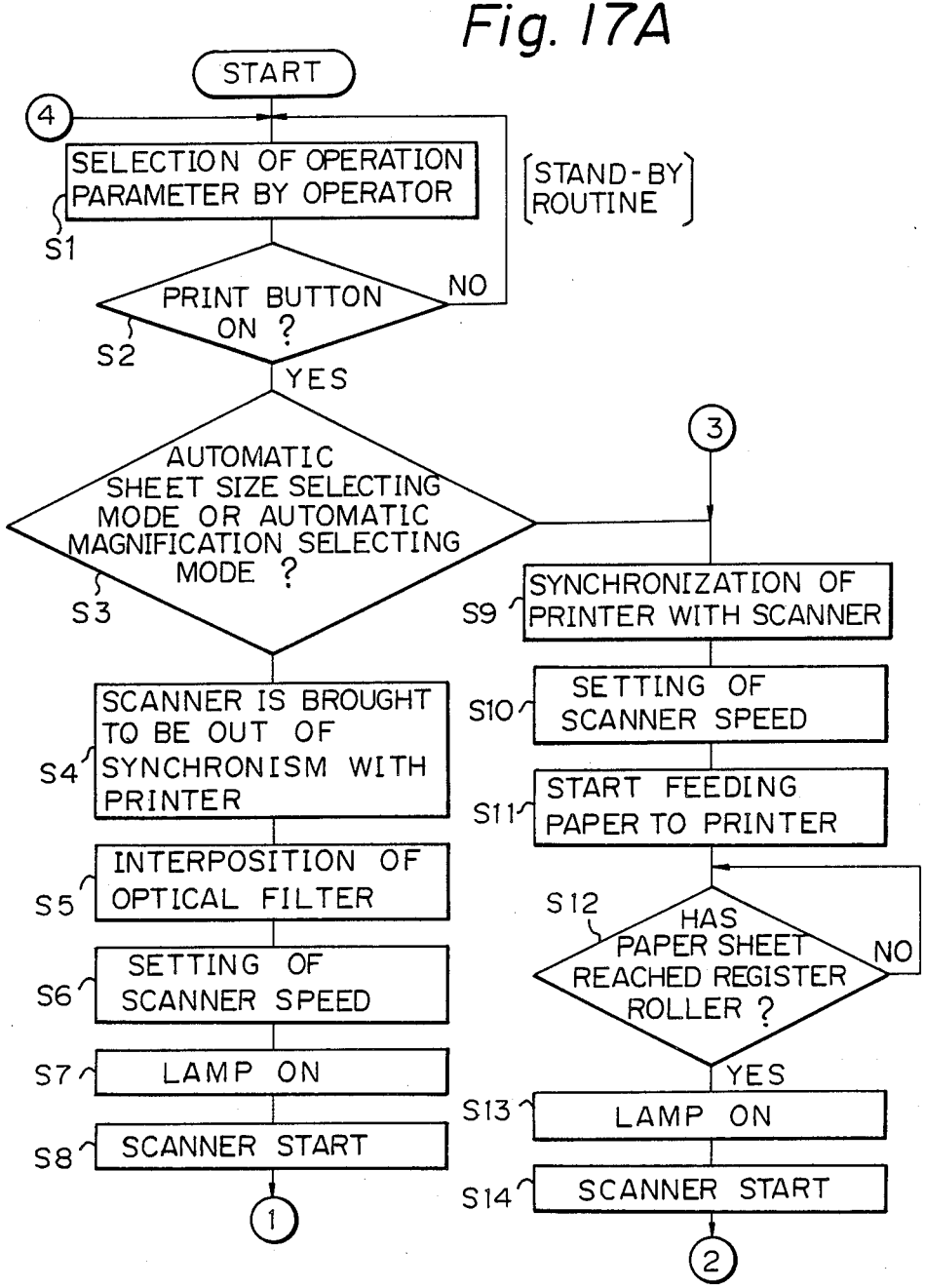
FIGS. 17A to 17C are flow charts showing the operation sequence of the image forming apparatus.
Figure 17B:
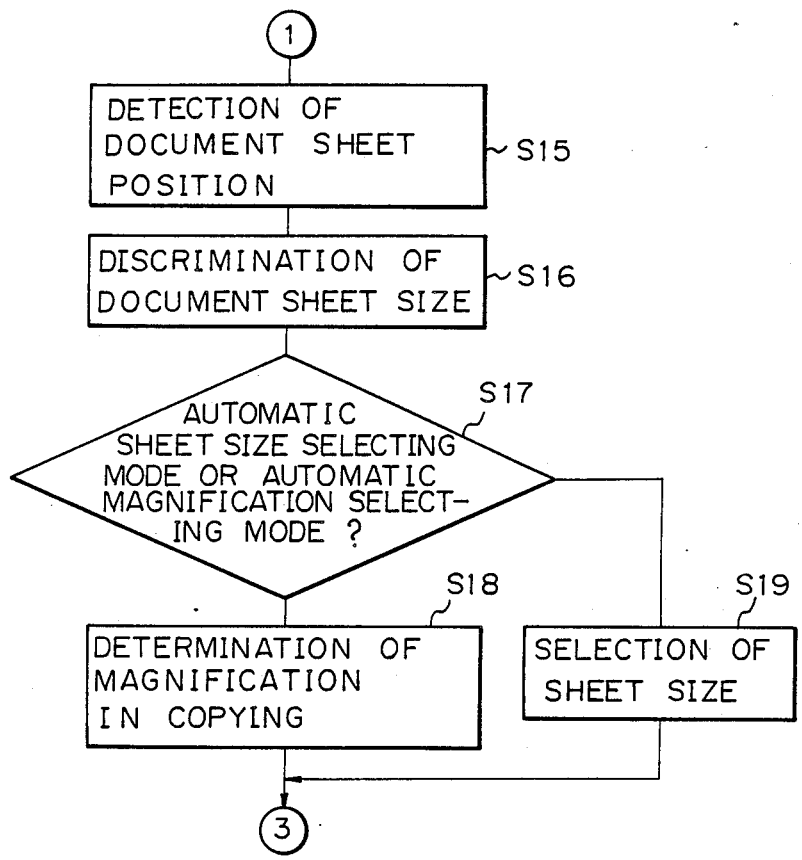
Figure 17C:
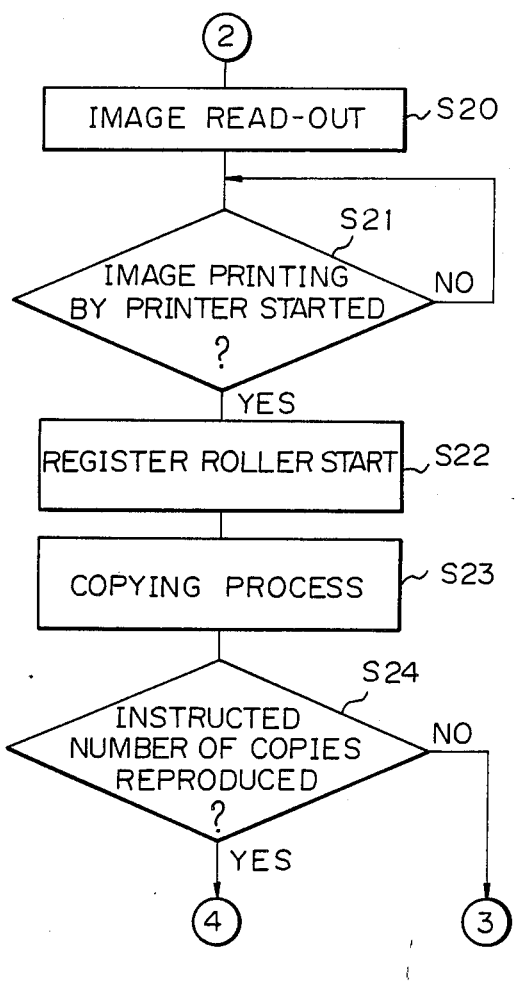

FIGS. 17A to 17C are flow charts showing the operations of the overall image forming apparatus in which the device of the present invention is incorporated. The routine shown in the Figures is started as the system is connected to an external power source. Various parameters for operation are selected by an operator at the step 1. The parameters selected by the operator include, for example, the selection of magnification, the copy density control, the number of copies, the size of the recording sheet, the instruction for automatic selection of the recording sheet and the instruction for automatic selection of magnification. After the lapse of a certain time, it is discriminated at the step 2 whether the print starting button is pushed on or not. When the print starting button has been pushed on, it is discriminated whether the automatic recording sheet selection mode is selected or the automatic magnification selection mode is selected, at the step 3. When the automatic magnification selection mode is selected, the printer is out of synchronism with the scanner at the step 4, and then the time for charge accumulation in the CCD image sensor is prolonged to 16 times as long as that during the normal image reading operation. The next step 5 is the step of interposing an optical filter having the characteristics as aforementioned. The scanning rate is set to 240 mm/sec at the step 6, followed by energization of the light source at the step 7, and then the scanner is actuated at the step 8. When it is discriminated, at the step 3, that the automatic recording sheet selection mode is selected, the printer is brought in synchronism with the scanner at the step 9. The scanning rate is set to $120 \times (100/\text{magnification}\alpha)$ mm/sec at the step 10. Feeding of paper sheets to the printer is initiated at the step 11, and it is discriminated whether a sheet of recording paper abuts against the register roller at the step 12. After inspecting that a sheet of recording paper has reached to the register roller, the fluorescent lamp is connected to a power source at the step 13, and then the scanner is started at the step 14.

As seen from FIG. 18B, subsequent to the step 8, the position of the document sheet is detected at step 15 and the size of the document sheet is detected at step 16. The next step 17 is the step for discriminating whether the automatic recording sheet selection mode is selected or the automatic magnification selection mode is selected. In cases where the automatic magnification selection mode is selected, a proper magnification is set at step 18. In case where the automatic recording sheet selection mode is selected, the size of the recording sheet is set properly at step 19. The subsequent operation sequence is shown in FIG. 17A. On the other hand, the normal image reading operations are carried out through the routines shown in FIG. 17C. Subsequent to step 14, the image reading operation is initiated at step 20. It is checked, at the step 21, whether transmission of image signals to the printer and reproduction of images by the printer are started. The register roller is begun to rotate at step 22, and the copying process including the image transferring, separation and fixing operations, are effected at step 23. The next step 24 is the step for discriminating whether the copying of instructed number of copies has been completed or not. When the instructed number of copies has not yet been reproduced, the operation sequence shown by the routine (3) is repeated. When the instructed number of copies has been already reproduced, the system is returned back to the stand-by routine as denoted by (4).

By the use of the device having the construction as described in detail hereinbefore, the position and/or size of an image bearing document sheet can be easily detected simply and precisely.

Although the present invention has been described with reference to preferred embodiments thereof, various modifications will become possible for those skilled in the art after receiving the teachings of the present disclosure without departing from the scope thereof.

What is claimed is:

1. A document sheet position detecting device for optically detecting the extension of an image bearing document sheet by a raster scanning operation, comprising:

a document sheet cover for pressing said document sheet onto a contact glass platen, said cover being colored by a certain predetermined color;

illumination means for illuminating the surface of said image bearing document sheet;

an optical system for passing light rays reflected by said surface of said image bearing document sheet;

a photoelectric converter element for receiving light rays and for converting said light rays into electric signals;

digital converter means for converting the outputs from said photoelectric converter element into digital signals;

an optical filter for shielding light rays reflected by said document cover and for transmitting therethrough light rays reflected by the background of said image bearing document sheet during a document sheet position detecting operation, said optical filter being interposed in the optical path of the reflected light during the document sheet position detecting operation and retracted from the optical path of the reflected light during the normal image read-out operation; and data processing means for detecting at least one end of said image bearing document sheet by processing positional data fed from said photoelectric converter means, the positional data indicating said document sheet cover being differentiated from the positional data indicating the background of said image bearing document sheet by the difference in quantity of light rays reflected by said background of said image bearing document sheet and passing through said optical filter to be received by said photoelectric converter means.

2. A document sheet position detecting device as claimed in claim 1, in which said positional data include positional data along the main scanning direction and positional data along the subsidiary scanning direction, and said data processing means is constructed to process the positional data both along the main and subsidiary scanning directions in combination so as to determine the size of said document sheet.

3. A document sheet position detecting device as claimed in claim 2, in which said document sheet is quadrilateral and has four corners, and a standard positioning point is marked on said contact glass platen so that said document sheet is placed on said contact glass platen with one of said four corners of said document sheet being aligned with said positioning point, said data processing means being constructed to process the positional data obtained by detecting the corner diagonal to said one corner which is positioned to align with said standard positioning point to determine the size of said document sheet.

4. A document sheet position detecting device as claimed in claim 2, in which said document sheet is quadrilateral and has four corners, said processing means being constructed to process the positional data obtained by detecting at least three corners to determine the size of said document sheet.

5. A document sheet position detecting device as claimed in claim 2, in which said document sheet is quadrilateral and has four sides, and a standard positioning line is marked on said contact glass platen so that said document sheet is placed on said contact glass platen with one of said four sides of said document sheet extending along said standard positioning line, said data processing means being constructed to process the positional data obtained by detecting two corners of the side opposed to and parallel to the side extending along said standard positioning line to determine the size of said document sheet.

6. A document sheet position detecting device as claimed in claim 2, in which said document sheet is quadrilateral and has four sides and four corners, and a standard positioning line and a central point of said standard positioning line are marked on said contact glass platen so that said document sheet is placed on said contact glass platen with one of said four sides of said document sheet extending along said standard positioning line and with the center of the side being aligned with said central point of said standard positioning line, said data processing means being constructed to process the positional data obtained by detecting one corner of the side opposed to and parallel to the side extending along said standard positioning line to determine the size of said document sheet.

7. A document sheet position detecting device as claimed in claim 1, in which said positional data are signals indicating densities of plural picture elements aligned along a line in separated interrelation.

8. A document sheet position detecting device as claimed in claim 1, in which said positional data are signals indicating densities of adjacent picture elements.

9. A document sheet position detecting device as claimed in claim 1, in which said positional data are binary-coded by a predetermined threshold by said data processing means to discriminate the data indicating the background of said document sheet from the data indicating said document cover sheet, and the binary-coded data are further processed to determine the position of said document sheet.

10. A document sheet position detecting device as claimed in claim 7, in which said positional data are binary-coded by a predetermined threshold by said data processing means to discriminate the data indicating the background of said document sheet from the data indicating said document cover sheet, and the binary-coded data are further processed to determine the size of said document sheet.

11. A document sheet position detecting device as claimed in claim 8, in which said positional data are binary-coded by a predetermined threshold by said data processing means to discriminate the data indicating the background of said document sheet from the data indicating said document cover sheet, and the binary-coded data are further processed to determine the size of said document sheet.

12. A document sheet position detecting device as claimed in claim 1, in which said data processing means holds the first and last shift points at which the quantity of received light are changed as the candidate data indicating the ends of the document sheet during the raster scanning operation, the minimum address being selected for the first shift point and the maximum address being selected for the last shift point to determine the span of the scanning along the main scanning direction.

13. A document sheet position detecting device as claimed in claim 1, in which said data processing means decides that the scanned area is a background portion when there is detected at least one shift point at which the quantity of received light is changed during the raster scanning operation along the main scanning direction, and in which said data processing means determines the span of the subsidiary scanning based on the address of appearance of said first shift point at which the quantity of light is changed during the movement along the subsidiary scanning direction and also based on the address of disappearance of said last shift point at which the quantity of light is changed.

14. A document sheet position detecting device as claimed in claim 12, in which said data processing means decides that the scanned area is a background portion when there is detected at least one shift point at which the quantity of received light is changed during the raster scanning operation along the main scanning direction, and in which said data processing means determines the size of said document sheet based on the address of appearance of said first shift point at which the quantity of light is changed during the movement along the subsidiary scanning direction and also based on the address of disappearance of said last shift point at which the quantity of light is changed.

15. A document sheet position detecting device as claimed in claim 1, in which said document sheet cover has the spectral reflectance characteristics such that it reflects a sufficiently large quantity of light rays within the wavelength range to which said photoelectric converter element is sensitive and such that it reflects an extremely small quantity of light rays within the same wavelength range including the spectral distribution of the light rays emitted from said illumination means, and in which said optical filter has a high transmittance to the light rays within the wavelength range of which said document sheet cover has a low spectral reflectance, whereby the output from said photoelectric converter element is small for the light reflected by the surface of said document sheet cover and the output from said photoelectric converter element is large for the light reflected by the surface of the background of said document sheet.

16. A document sheet position detecting device as claimed in claim 1, in which said optical system includes a lens and a reflector mirror positioned upstream of said lens, said optical filter being retractably positioned between said reflector mirror and said lens.

17. A document sheet position detecting device as claimed in claim 1, in which said optical system is disposed upstream of said photoelectric converter element and has a lens, said optical filter being retractably positioned between said lens of said optical system and said photoelectric converter element.

18. A document sheet position detecting device as claimed in claim 1, in which two or more of said photoelectric converter elements are disposed in a line along the main scanning direction, said two or more photoelectric converter elements being movable in the direction along the subsidiary scanning direction.

19. A document sheet position detecting device as claimed in claim 1, in which said positional data fed from said photoelectric converter element are converted into serial data which are passed to a system controller.

20. A document sheet position detecting device as claimed in claim 1, further comprising means for interposing said optical filter through the optical path of the reflected light during the document sheet position detecting operation, and correction means for correcting the change in quantity of reflected light due to interposition of said optical filter by prolonging the charge accumulating time for said photoelectric converter element.

21. A document sheet position detecting device as claimed in claim 20, in which the sampling pitch along the subsidiary scanning direction during the document sheet position detecting operation is varied from that during the normal image read-out operation depending on the change in charge accumulating time for said photoelectric converter element.

22. A document sheet position detecting device as claimed in claim 1, in which the scanning speed along the subsidiary scanning direction during the document sheet position detecting operation is differentiated from that during the normal image read-out opration.

23. A document sheet position detecting device as claimed in claim 1, in which the read-out width of a standard white plate during the document sheet position detecting operation is differentiated from that during the normal image read-out operation.

24. A document sheet position detecting device as claimed in claim 21, in which the read-out width of a standard white plate during the document sheet position detecting operation is differentiated from that during the normal image read-out operation.

25. A document sheet position detecting device as claimed in claim 22, in which the read-out width of a standard white plate during the document sheet position detecting operation is differentiated from that during the normal image read-out operation.

26. A document sheet position detecting device as claimed in claim 22, in which illumination by said illumination means during the document sheet position detecting operation is effected for a longer time than the illumination time during the normal image read-out operation.

27. A document sheet position detecting device as claimed in claim 1, further comprising switching means acting to switch so that the horizontal synchronizing signal for the raster scanning during the document sheet position detecting operation is fed from an internal signal source and so that the horizontal synchronizing signal during the normal image read-out operation is fed from an external signal source.

28. A document sheet position detecting device as claimed in claim 21, further comprising switching means acting to switch so that the horizontal synchronizing signal for the raster scanning during the document sheet position detecting operation is fed from an internal signal source and so that the horizontal synchronizing signal during the normal image read-out operation is fed from an external signal source.

29. A document sheet position detecting device as claimed in claim 22, further comprising switching means for effecting a switching operation so that the horizontal synchronizing signal for the raster scanning during the document sheet position detecting operation is fed from an internal signal source and so that the horizontal synchronizing signal during the normal image read-out operation is fed from an external signal source.

30. A document sheet position detecting device as claimed in claim 1, further comprising an exposure correction means for prolonging the charge accumulating time for said photoelectric converter element during the document sheet position detecting operation than the charge accumulating time for said photoelectric converter element during the normal image read-out operation.

31. A document sheet position detecting device as claimed in claim 1, further comprising exposure correction means for increasing the quantity of light fed from said illumination means during the document sheet position detecting operation so that the quantity of illumination light emitted during the document sheet position detecting operation is larger than that emitted during the normal image read-out operation.

32. A document sheet position detecting device as claimed in claim 30, further comprising means for varying the data transmission rate from said photoelectric converter element depending on the change in charge accumulating time for said photoelectric converter element.

33. A document sheet position detecting device as claimed in claim 31, further comprising means for varying the data transmission rate from said photoelectric converter element depending on the change in quantity of light emitted from said illumination means.

34. A document sheet position detecting device as claimed in claim 30, in which said raster scanning operation is out of synchronism with the horizontal synchronizing signal from an external signal source accompanying with the change in charge accumulating time for said photoelectric converter element.

35. A document sheet position detecting device as claimed in claim 31, in which said raster scanning operation is out of synchronism with the horizontal synchronizing signal from an external signal source accompanying the change in quantity of light emitted from said illumination means.

* * * * *